United States Patent [19]
Côté et al.

[11] Patent Number: 6,045,698
[45] Date of Patent: Apr. 4, 2000

[54] METHOD FOR CLEANING A FILTRATION INSTALLATION OF THE TYPE WITH IMMERSED MEMBRANES

[75] Inventors: Pierre Côté, Andresy; Annie Tazi-Pain, Asnieres sur Seine; Patricia Grelier, Sartrouville, all of France

[73] Assignee: Omnium de Traitements et de Valorization (oTV), Saint-Maurice Cedex, France

[21] Appl. No.: 09/068,922
[22] PCT Filed: Nov. 19, 1996
[86] PCT No.: PCT/FR96/01827
  § 371 Date: Jul. 29, 1998
  § 102(e) Date: Jul. 29, 1998
[87] PCT Pub. No.: WO97/18887
  PCT Pub. Date: May 29, 1997

[30] Foreign Application Priority Data

Nov. 22, 1995 [FR] France .................................... 95 14188

[51] Int. Cl.[7] ................................ B08B 3/04; B08B 3/08; B01D 63/00
[52] U.S. Cl. ................ 210/636; 210/321.79; 210/321.8; 210/321.78; 134/2; 134/3; 134/10; 134/27; 134/28; 134/29; 134/98.1; 134/169 R; 134/103.1; 134/170; 134/95.1
[58] Field of Search .............................. 134/2, 3, 10, 27, 134/28, 29, 41, 95.1, 98.1, 166 R, 169 R, 103.1, 170; 210/636, 321.79, 321.8, 321.78

[56] References Cited

U.S. PATENT DOCUMENTS

| 5,248,424 | 9/1993 | Cote et al. ................................ 210/636 |
| 5,403,479 | 4/1995 | Smith et al. ........................ 210/321.69 |
| 5,647,988 | 7/1997 | Kawanishi et al. ..................... 210/636 |

FOREIGN PATENT DOCUMENTS

| 0 510 328 | 10/1992 | European Pat. Off. . |
| 0 655 418 | 5/1995 | European Pat. Off. . |
| 63-093310 | 4/1988 | Japan . |
| 4131182 | 5/1992 | Japan . |
| 2 248 559 | 4/1992 | United Kingdom . |
| 94/11094 | 5/1994 | WIPO . |

OTHER PUBLICATIONS

Yamamoto, Kazuo, et al. "Direct solid–liquid separation using hollow–fiber membrane in an activated sludge aeration tank"; Water Science Technologie; vol. 21, 1989, pp. 43–54.

1995 Database WPI; Derwent Publications Ltd.; Week 9527; 95–203022; May 9, 1995.

1993 Database WPI; Derwent Publications Ltd.; Week 9333; 93–260992; Jul. 20, 1993.

1993 Database WPI; Derwent Publications Ltd.; Week 9314; 93–112165; Mar. 2, 1993.

Primary Examiner—Zeinab El-Arini
Attorney, Agent, or Firm—Coats & Bennett, P.L.L.C.

[57] ABSTRACT

The invention relates to a method of cleaning a filtration installation of the type including a plurality of immersed membranes in at least one tank containing an effluent to be filtered, said method being characterised in that it includes the steps consisting of:

at least partially draining the effluent contained in said tank in a way that exposes said membranes to the air;

causing at least one cleaning solution to pass through said membranes along a flow path opposite to the filtration flow of the effluent by feeding in said cleaning solution from the permeate side of said membranes.

14 Claims, 2 Drawing Sheets

6,045,698

1

METHOD FOR CLEANING A FILTRATION INSTALLATION OF THE TYPE WITH IMMERSED MEMBRANES

This is a national stage application of PCT/FR96/01827 filed Nov. 19, 1996, now WO 97/18887 published on May 29, 1997.

BACKGROUND OF THE INVENTION

1. Field of the Invention

The invention relates to the field of effluent filtration installations, particularly for water, for the purposes of its purification and for making it potable. More precisely, the invention relates to the field of such installations that include filtration membranes that are directly immersed in the effluent to be treated. Yet more precisely, the invention relates to a method of cleaning the membranes in such installations.

2. Description of the Prior Art

Immersed membrane installations are characterised by the use of micro-filtration or ultra-filtration membranes that may be flat, tubular or with hollow fibres, generally grouped together in modules and do not include any housing. These modules are immersed directly in the treatment tank containing the effluent to be filtered, and the permeate is extracted by aspiration. Such filtration installations are notably described in the patent U.S. Pat. No. 5,248,424 in the names of Côté et al. in the European Patent Application EP-A-510328 and in the article entitled "Direct solid-liquid separation using hollow-fiber membrane in an activated sludge aeration tank" in the names of Yamamoto et al. that appeared in 1989 in the journal Water Science Technology, vol. 21, pp. 43–54.

The immersed membranes employed in such installations are usually used under conditions that lead to little clogging at a low trans-membrane pressure that generally does not exceed 0.5 bar so as to space apart the cleaning operations for these membranes as much as possible. However cleaning operations remain necessary and are normally carried out with the help of chemical solutions that are usually hot.

In installations with traditional membranes, in which the filtration modules are not directly immersed in the effluent to be filtered, but are fitted with a housing and equipped with a filtration loop, the cleaning of the membranes can be easily carried out without taking the membranes out of the installation. This type of cleaning, called in-place cleaning, consists simply of circulating a cleaning solution in the recycling loop. Such a method is effective since it allows good control of the concentration of chemical product in the cleaning solution, the temperature of this solution and its contact time with the membranes. Furthermore, such a cleaning procedure can be made completely automatic. Finally, the volume of discharge is low and corresponds to the ullage of the recycling loop.

However, filtration installations of the type with immersed membranes do not incorporate either a housing or a recycling loop. One of the disadvantages associated with the use of such installations is therefore the fact that the cleaning operations are made much more difficult by the absence of such a housing surrounding the filtration modules and also by the absence of such a recirculation loop.

Several methods of cleaning such filtration installations with immersed membranes have been provided in the state of the technology.

One of these methods, called ex-situ cleaning consists simply of taking the filtration modules out of the tank one by one and cleaning them in a device specially provided for this purpose. Such a method allows effective cleaning of the membranes to be carried out but has a number of disadvantages. On the one hand, it causes the shut-down of the installation or a reduction in its efficiency during the relatively long time required to transfer the modules into the cleaning device and to carry out the cleaning operation itself. In addition, such a method also has the disadvantage of being difficult to automate which increases the cost of the method.

It has also been suggested in the state of the technology, to clean filtration installations with immersed membranes by replacing the effluent present in the treatment tank by a cleaning solution and operating the installation in the usual way so as to allow passage of the cleaning solution through the pores of the membranes. Such a technique also has numerous disadvantages. Although it is effective and can be automated, this method, in effect requires the use of a large volume of cleaning solution. Apart from the fact that the cost of the reactants is increased, it is more difficult and also more costly to heat up such a large volume of cleaning solution. Finally, the volume of the discharge (dirty cleaning solution) is also increased.

It should also be noted that, in the state of the technology a method has been proposed that aims at allowing the in situ cleaning of the membranes of an installation that includes such immersed membranes. Such a method, notably described in the American patent U.S. Pat. No. 5,403,479 in the names of Smith et al. consists of circulating a cleaning solution through the membranes along a flow path opposite to the filtration flow and this without emptying the tank within which the membranes are installed. The surplus cleaning solution not passing through the membranes is recycled in such a way as to minimise the volume of solution transferred into said tank The effectiveness of this method is limited since the cleaning solution used is inevitably diluted by the effluent present in the tank as soon as it has passed through the membrane, which considerably reduces its effectiveness. At the same time, the temperature of this cleaning solution reduces equally abruptly as soon as it has passed through and this also reduces its effectiveness. In addition, the period for injecting the cleaning solution must be limited in time so that the treatment in progress is not disturbed particularly since when it is a biological treatment, the biomass present in the tank can be quickly decimated if the cleaning solution is injected for too long a time. Finally, such a method cannot be employed when the immersed membrane installation under consideration is used within the context of making the water potable since the chemical reactants used in the cleaning solutions are incompatible with such a treatment

SUMMARY OF THE INVENTION

The object of this invention is to provide a cleaning method for a filtration installation of the type with immersed membranes that does not have the disadvantages of the state of the technology.

More particularly, one of the objects of the invention is to provide such a method that can be implemented while keeping the membranes in place in the installation.

A further object of the invention is to describe such a method of in-place cleaning that involves low volumes of cleaning solutions and does not lead to their dilution.

Another object of the invention is to offer such a method that can be easily automated.

Yet another object of the invention is to provide a filtration installation that permits the implementation of such a method.

These different objectives as well as others that will become apparent in the following are achieved by a method of cleaning a filtration installation of the type that includes a plurality of membranes immersed in at least one tank containing an effluent to be filtered, said method being characterised in that it includes steps consisting of:

at least partially emptying the effluent contained in said tank in order to expose said membranes to the air;

causing at least one cleaning solution to pass through the pores of said membranes along a flow path opposite to the filtration flow of the effluent by passing in said cleaning solution from the permeate side of said membranes.

Preferably said method includes a step consisting of recovering or neutralising said cleaning solution having passed through said membranes actively employed in said tank.

Hence, the invention provides an original way of carrying out in-place cleaning of membranes of the installation by at least partially emptying the tank in which the filtration membranes are installed, in such a way as to allow passage of the cleaning solution used from the permeate side of the membranes towards the outside of the membranes and then a flow of this solution over the external surface of the membranes to the bottom of the tank. In this way, the cleaning solution is used to the maximum of its capabilities since it is not diluted on its exit from the membranes and on the contrary it can run along the membranes after having passed through their pores.

In addition, such a method allows one to provide uniform distribution of the cleaning solution on the membranes since there is no counter pressure exerted against it.

Taking into account the fact that the cleaning solution does not become diluted after passing through the pores of the membranes, it is possible furthermore, to use smaller volumes of cleaning solutions than those required to obtain effective cleaning in the context of the method described above in accordance with the patent U.S. Pat. No. 5,403,479. This constitutes another advantage of the method since it will be able to be used at less cost.

Although such a method can be used with any filtration installation with immersed membranes, this method is advantageously used in installations in which the membranes are in a vertical position inside said tank. In effect, such a position favours the flow of the cleaning solution over the external surface of the membranes after its passage through the pores of the membranes.

In this case, according to a preferred and particularly interesting aspect, said step of the method according to the invention that consists of causing at least one cleaning solution to pass through the pores of said membranes along a flow path opposite to the flow for the filtration of the effluent, is carried out by alternatively or simultaneously feeding said cleaning solution through the top and through the bottom of said membranes. Such a characteristic feature allows one to wet the membranes well and, as a consequence to use smaller cleaning volumes. On this subject, it should be noted that in the technique disclosed by the American patent mentioned above, the cleaning solution is always fed through the bottom of the filtration modules.

Advantageously, said method consists of carrying out a cleaning sequence including at least one step consisting of causing at least one basic cleaning solution to pass through said membranes and at least one step consisting of causing at least one acidic cleaning solution to pass through the pores of said membranes. The use of such a basic cleaning solution and such an acidic cleaning solution allows the effectiveness of the cleaning operation carried out using the method according to the invention, to be further increased.

Preferably, said method also includes at least one step consisting of causing at least one cleaning solution containing an oxidising agent to pass through the pores of said membranes. Such a solution could, for example be constituted by a solution of sodium hypochlorite or of hydrogen peroxide.

Yet more preferably, said method includes at least one step consisting of causing at least one cleaning solution containing a base and a chlorine compound to pass through the pores of said membranes and one step consisting of causing at least one acid cleaning solution to pass through the pores of said membranes. In effect, it has been observed that the use of such a sequence leads to a particularly effective cleaning of the membranes as will be explained in greater detail below. Notably such a sequence allows the use of cleaning solutions at ambient temperature eliminating the quasi-necessity of the state of the technology to heat up the cleaning solutions normally used.

Advantageously, said steps of said sequence are interspersed with, followed by or preceded by one or more rinsing steps consisting of causing water to pass within said membranes.

Equally advantageously, said method can include at least one soaking step during which the supply of cleaning solution is stopped so as to let it impregnate the membranes and thereby increase its effectiveness.

Advantageously the cleaning solution or solutions is or are used at the rate of a total volume of between 2 and 20 liters per square meter of membrane. These volumes are very much less than those used in the state of the technology which are traditionally of the order of 50 liters per square meter.

Preferably, the total duration of said cleaning sequence is between 30 minutes and 4 hours.

The invention also relates to an installation for the implementation of such a method, said installation including at least one treatment tank inside which a plurality of filtration membranes are vertically installed together with means of feeding an effluent to be filtered into said tank, means of draining said tank, means of discharging the permeate coming from said membranes, at least one storage reservoir for a solution for cleaning said membranes, means of feeding said cleaning solution from the permeate side of said membranes and which is characterised in that said means of feeding in said cleaning solution include means that allow said cleaning solution to be supplied alternately or simultaneously through the top or through the bottom of said membranes.

According to an interesting variant of the invention, this installation advantageously includes at least two treatment tanks assembled in parallel each having on the inside, a plurality of vertically installed filtration membranes, and that it includes means that permit the cleaning of the membranes of the first tank and means that permit the contents of this first tank to be stored in the second tank during the cleaning.

Preferably such an installation includes means of connecting said drainage means with said supply means.

BRIEF DESCRIPTION OF THE DRAWINGS

The invention as well as the different advantages that it offers will be more easily understood through the description that follows of a non-limitative way of implementing the invention that makes reference to the drawings in which.

DESCRIPTION OF THE PREFERRED EMBODIMENTS

Figure 1:
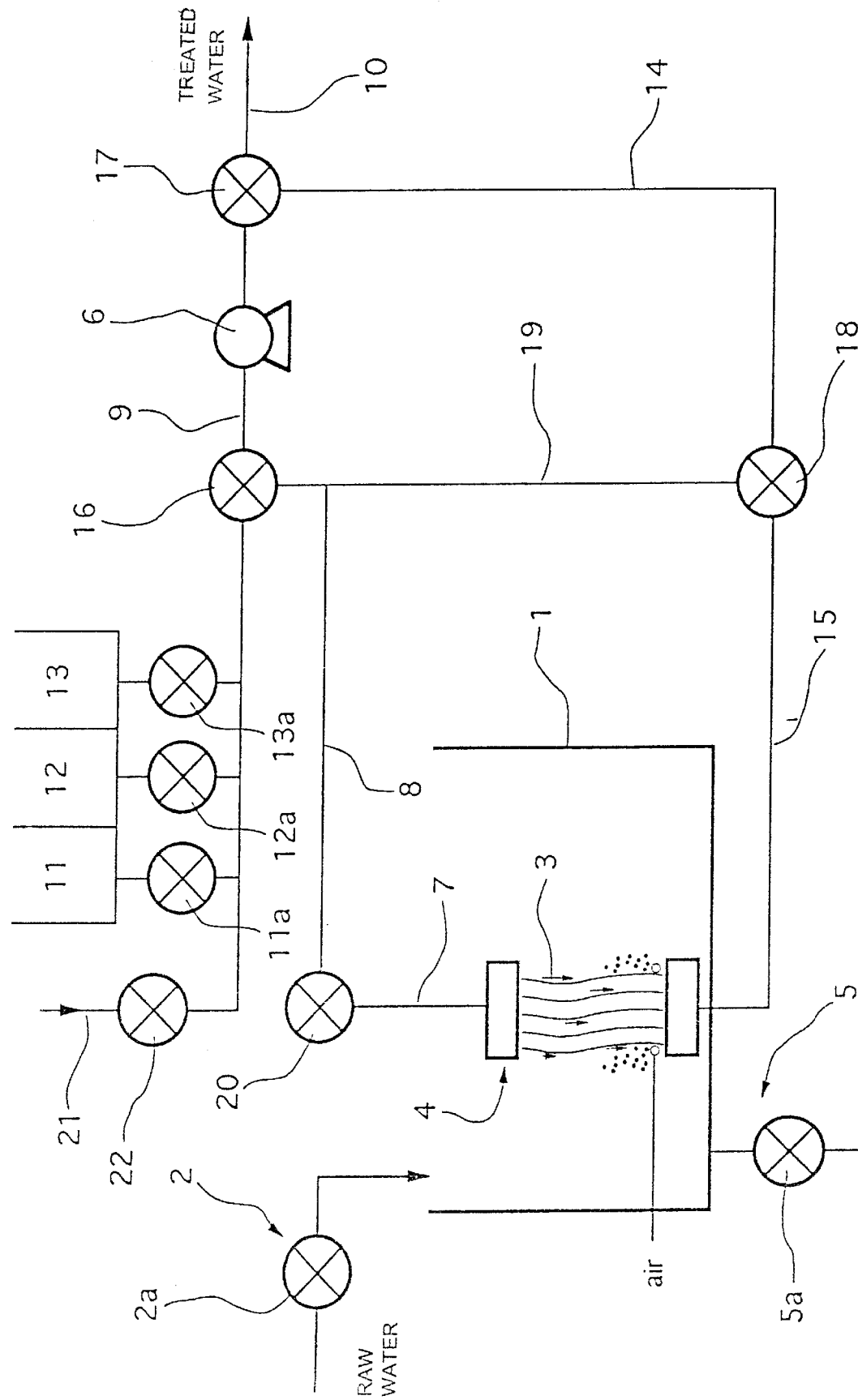
FIG. 1 represents a diagram of a first embodiment of an installation conforming to this invention.

Referring to FIG. 1, the filtration installation represented includes a treatment tank 1. This tank is, as usual, fitted with means 2 of feeding in the effluent to be filtered that includes a shut-off valve 2a and means of draining the tank 5 that include a shut-off valve 5a. The installation is continuously fed with water to be filtered through the valve 2a controlled by the water level in the tank.

A plurality of membranes 3, organised in a module 4, are installed vertically in said tank. In the embodiment described, these membranes are constituted by ultra-filtration membranes made up of hollow fibres with filtration from the outside to the inside, and assembled into a module of 12 m$^2$.

The installation also includes an aspirating pump 6 that allows the extraction of the treated effluent constituted by the permeate from the membranes, through a network of channels 7, 8, 9, 10, 15 and 19. The installation further includes three reservoirs 11, 12, 13 for storing cleaning solutions, each fitted with a shut-off valve 11a, 12a and 13a, as well as means that include a set of channels 14, 15 and a set of valves 16, 17, 18 that permit these cleaning solutions to be fed into the foot of the module 4, that is to say to the bottom of said membranes 3. Conforming to the invention, the installation also includes means that include a channel 19, a valve 20 and channels 8, 9, 14 and valves 16, 17 and 18 that allow the cleaning solutions to be fed into the head of the module 4, that is to say to the top of the filtration membranes 3. Finally, it should also be noted that the content of the tanks is connected to a supply of mains water 21 fitted with a shutoff valve 22.

In filtration mode, the shut-off valve 2a for the means 2 supplying the raw effluent to the tank 1 is open and the shut-off valve 5a of the means 5 to drain the tank is closed, the effluent therefore filling the tank 1 in such a way that the filtration membranes 3 are submerged. In addition, the valve 20 is actuated so as to put channel 7 in communication with channel 8 and valve 18 is actuated to put channel 15 in communication with channel 19. Finally, valve 16 is actuated to put channels 8 and 19 in communication with channel 9 and valve 17 is actuated to put channel 9 in communication with channel 10 for discharging the permeate. Hence the permeate is drawn off from the head and from the foot of the module 4 at the same time.

When the membranes 4 are clogged and must be cleaned, the installation is operated according to the cleaning method of the invention. The cleaning solutions contained in reservoirs 11, 12 and 13 can then be used to unclog these membranes and can advantageously be injected alternately through the top and through the bottom of the membranes. It will also be noted that the cleaning solutions could also be injected simultaneously through the top and through the bottom of the membranes.

According to the first step in this cleaning method, the tank 1 is drained by closing shut-off valve 2a of the means supplying effluent to the tank 1 and by opening the shut-off valve 5a of the drainage means 5, in such a way as to allow the discharge of the effluent from the tank and to permit the membranes to be exposed to the air.

According to the second step consisting of carrying out the cleaning cycle itself, the three cleaning solutions are used one after the other.

For example, if one chooses to first use the solution contained in reservoir 13, as shown in FIG. 1, valve 13a of this reservoir is opened (the valves 11a and 12a of the other reservoirs remaining closed). Concomitantly, valve 20 is closed, valve 16 is actuated in a way that puts reservoir 13 in communication with channel 9, valve 17 is actuated in a way that puts channel 9 and channel 14 in communication, and valve 18 is actuated in a way that puts channel 14 in communication with channel 15. In this way, the cleaning solution arrives through the bottom of the membranes and propagates in ascending fashion over the entire height of the membranes. The flow rate of this solution is obviously calculated to permit good wetting of the membranes. The cleaning solution passes easily through the membranes, since there is no liquid capable of exerting a back pressure present in the tank. The solution then flows along the membranes. After having passed through the membranes, the cleaning solution, made dirty by the impurities present on the membranes is discharged through the means 5 for draining the tank 1. It should be noted that it is equally possible, in other implementation modes of the method according to the invention, not to discharge the cleaning solution or solutions from the tank but simply to neutralise them.

After a given time for supplying the cleaning solution through the bottom of the membranes, this same solution cane subsequently be fed through the top of the membranes in a way that increases the effectiveness of the cleaning and in order to complete the wetting of the membranes. To this end, valve 18 is actuated in a way that puts channel 14 in communication with channel 19 and valve 20 is actuated in a way that puts channel 8 in communication with channel 7. The cleaning solution is then fed in through the top of the membranes. After having passed through them it flows along the membranes and is discharged through the drainage means 5.

After having used the cleaning solution contained in reservoir 13, the cleaning sequence can be continued by then using the cleaning solutions contained in reservoirs 12 and 11 by also feeding them alternately through the top and through the bottom of the membranes 4. On each change of cleaning solution, mains water or the permeate can be used to rinse the channels through which this solution passes. In addition, it should be noted that for each step in the cleaning sequence, the supply of cleaning solution may be stopped (by closing the relevant valve 11a, 12a or 13a and switching off the pump 6) so as to allow time for the membranes to be soaked by the cleaning solution.

The installation in accordance with FIG. 1 has been operated according to several cleaning sequences, No. 1, No. 2, No. 3 and No. 4 details of which are shown in Table 1 below, after the membranes have been clogged by water from the Seine (30 NTU) or with residuary urban water. For the Seine water, the first three sequences (1,2,3) have been carried out with an empty tank and the last one (4) has been tested with an empty tank and a full tank. For the residuary urban water, sequence 1 has been tested with an empty tank and a fill tank.

All these cleaning sequences consist of a base step, an acid step and a chlorine step with the exception of the last sequence for which only two steps have been implemented (sodium hypochlorite and acid). To put it more clearly, in sequences No. 1, No. 2 and No. 3, three cleaning solutions have been applied successively: a first solution containing a base, a second solution containing citric acid at 0.5% and a third solution of sodium hypochlorite at 0.03%. In sequence No. 4, only two cleaning solutions have been used: a first solution constituted by mixing in aqueous solution a base and 0.03% sodium hypochlorite solution and a second solution of citric acid at 0.5%. Between each cleaning solution, the membranes were rinsed with mains water, this being fed into the tank using channel 21 and shut-off valve 22.

In addition, in sequences No. 1, No. 3 and No. 4, supply through the top and then through the bottom of the membranes was carried out for each cleaning solution and for each rinsing with flow rates of 100 l/h and for supply times varying from 2.5 to 30 minutes.

With regard to sequence No. 2, only a supply through the bottom was carried out at a flow rate of 250 l/h and with supply times of 30 minutes for the basic cleaning solution, 15 minutes for the two other cleaning solutions and 5 minutes for the rinsing with mains water.

Finally, in sequences No. 2 and No. 3 soaking times varying from 15 to 40 minutes were applied after injection of the cleaning solutions.

which the base used as the basic cleaning solution was 1% sodium hydroxide at 25° C. (pH=11.9).

Cleaning sequence No. 4 has been implemented for three cleaning operations in which the base used as the cleaning solution containing both a base and sodium hypochlorite was 0.5% sodium hydroxide (cleaning operations No. 12, 14 and 15)

All these cleaning operations have been carried out, according to the invention, with the tank 1 empty. Only cleaning operation No. 15 was carried out, for comparison purposes, with the tank full of effluent.

During these different cleaning operations, different volumes of cleaning solution have been used ranging from 4.6 to 23.3 l/m².

Two cleaning operations were also carried out after the membranes had been clogged with residuary urban water and activated sludge, as described in Table 3.

TABLE 1

Chemical cleaning sequences tested

| Sequence No. | Step | Reactant used | Top supply | Bottom supply | Soaking | Total sequence time | Volume |
|---|---|---|---|---|---|---|---|
| 1 | 1 | Base | 100 l/h for 30 min* | 100 l/h for 2.5 min | — | 60 min | 100 l |
|   | 2 | Mains water | 100 l/h for 2.5 min | 100 l/h for 2.5 min | — | 5 min | 10 l |
|   | 3 | Citric acid-0.5% | 100 l/h for 15 min | 100 l/h for 15 min | — | 30 min | 50 l |
|   | 4 | Mains water | 100 l/h for 2.5 min | 100 l/h for 2.5 min | — | 5 min | 10 l |
|   | 5 | NaClO-0.03% | 100 l/h for 15 min | 100 l/h for 15 min | — | 30 min | 50 l |
|   | Overall sequence |  |  |  |  | 130 min | 220 l (18.3 l/m²) |
| 2 | 1 | Base | — | 250 l/h for 30 min | 30 min | 60 min | 125 l |
|   | 2 | Mains water | — | 250 l/h for 5 min | — | 5 min | 20 l |
|   | 3 | Citric acid-0.5% | — | 250 l/h for 15 min | 15 min | 30 min | 62.5 l |
|   | 4 | Mains water | — | 250 l/h for 5 min | — | 5 min | 20 l |
|   | 5 | NaClO-0.03% | — | 250 l/h for 15 min | 15 min | 30 min | 62.5 l |
|   | Overall sequence |  |  |  |  | 130 min | 290 l (24.2 l/m²) |
| 3 | 1 | Base | 100 l/h for 10 min**** | 100 l/h for 10 min**** | 40 min**** | 60 min | 100 l |
|   | 2 | Mains water | 100 l/h for 2.5 min | 100 l/h for 2.5 min | — | 5 min | 10 l |
|   | 3 | Citric acid-0.5% | 100 l/h for 5 min***** | 100 l/h for 5 min***** | 20 min***** | 30 min | 16.6 l |
|   | 4 | Mains water | 100 l/h for 2.5 min | 100 l/h for 2.5 min | — | 5 min | 10 l |
|   | 5 | NaClO-0.03% | 100 l/h for 5 min***** | 100 l/h for 5 min***** | 20 min***** | 30 min | 16.6 l |
|   | Overall sequence |  |  |  |  | 130 min | 86.5 l (7.2 l/m²) |
| 4 | 1 | Base, NaClO 0.03% | 100 l/h for 30 min* | 100 l/h for 30 min* | — | 60 min | 100 l |
|   | 2 | Mains water | 100 l/h for 2.5 min | 100 l/h for 2.5 min | — | 5 min | 10 l |
|   | 3 | Citric acid-0.5% | 100 l/h for 15 min | 100 l/h for 15 min | — | 30 min | 50 l |
|   | Overall sequence |  |  |  |  | 95 min | 160 l (13.3 l/m²) |

*(Supply 20 minutes through the top, then through the bottom, supply 10 minutes through the top, then through the bottom)
****(Supply through the top 5 minutes, soaking 10 minutes, supply through the bottom 5 minutes, soaking 10 minutes) carried out twice
*****(Supply through the top 5 minutes, soaking 10 minutes, supply through the bottom 5 minutes, soaking 10 minutes)
Sequence 3* consists of extending the recirculation time and reducing the soaking time
Sequence 4* consists of reducing the recirculation time and extending the soaking time.

These different cleaning sequences have been implemented in the course of different cleaning operations after the membranes have been clogged with water from the Seine as described in Table 2.

Cleaning sequence No. 1 has been implemented for a cleaning operation in which 1% sodium hydroxide at 25° C. (pH=11.7) has been tested as the basic cleaning solution (cleaning operation No. 7).

Cleaning sequence No. 2 has been implemented for a single cleaning operation in which the base used as the basic cleaning solution was 1% sodium hydroxide at 25° C. (pH=11.9) (cleaning operation No. 2).

Cleaning sequence No. 3 has been implemented for two cleaning operations (cleaning operations No. 8 and No. 9) in In the course of these two cleaning operations (cleaning operations No. 16 and No. 17), the cleaning sequence used was sequence No. 1 with Ultrasil at 60% as base. Cleaning operation No. 16 was carried out in accordance with the invention (empty tank) while cleaning operation No. 17 was carried out for comparison purposes with the tank full.

The quality of the cleaning operations carried out was evaluated on the one hand by calculating the percentage permeability of the membranes to mains water after cleaning in relation to the permeability of new membranes and, on the other hand by evaluating the increase in permeability of these membranes.

Table 2 gives the results obtained with water from the Seine. Table 3 gives the results obtained with residuary urban water and the activated sludges.

TABLE 2

Effectiveness of the chemical cleaning operations carried out
Clogging from Seine water
Cleaning operations from 1 to 6: Permeate flow = 500 l/h
Cleaning operations from 7 to 13: Permeate flow = 400 l/h
Reference permeability of the new membrane = 220 l/h · m² · bar

| Cleaning operation No. | Sequence No. | Reactant used for step 1 | Volume used l/m² | | Permeability mains water (QEF = 400 l/h) before cleaning l/m² · h · bar | Permeability mains water (QEF = 400 l/h) after cleaning l/m² · h · bar | Permeability afterwards/ new membrane | Permeability increase (Lp before - Lp after) l/m² · h · bar |
|---|---|---|---|---|---|---|---|---|
| 2 | 2 | NaOH 25° C. 1%: pH = 11.9 | 23.3 | empty tank | 93 | 185 | 84 | 92 |
| 7 | 1 | NaOH 25° C. 1%: pH = 11.7 | 17.5 | empty tank | 109 | 214 | 97 | 105 |
| 8 | 3 | NaOH 25° C. 1% | 7.5 | empty tank | 98 | 182 | 83 | 84 |
| 9 | 3* | NaOH 25° C. 1%: pH = 11.9 | 12.5 | empty tank | 91 | 202 | 92 | 111 |
| 12 | 4 | NaOH + chlorine 25° C. 0.5% & 0.03% | 13.3 | empty tank | 90 | 210 | 95 | 120 |
| 14 | 4* | NaOH + chlorine 25° C. 0.5% & 0.03% | 4.6 | empty tank | 102 | 201 | 91 | 99 |
| 15 | 4 | NaOH + chlorine 25° C. 0.5% & 0.03% | 13.3 | full tank | 75 | 110 | 50 | 35 |

TABLE 3

Effectiveness of chemical cleaning operations carried out
Unclogging from residuary urban water - activated sludges
Reference permeability of the new membrane = 350 l/h · m² · bar

| Cleaning operation No. | Sequence No. | Reactant used for step 1 | Volume used l/m² | | Permeability mains water (QEF = 400 l/h) before cleaning l/m² · h · bar | Permeability mains water (QEF = 400 l/h) after cleaning l/m² · h · bar | Permeability afterwards/ new membrane | Permeability increase (Lp before - Lp after) l/m² · h · bar |
|---|---|---|---|---|---|---|---|---|
| 16 | 1* | Ultrasil 0.60% | 25 | empty tank | 180 | 325 | 93 | 145 |
| 17 | 1* | Ultrasil 0.60% | 25 | empty tank | 150 | 210 | 60 | 60 |

Sequence 1* = Sequence 1 with the rinsing times in steps 2 and 4 being 20 minutes.

These results show that the method of cleaning according to the invention, compared with the cleaning operation that consists of filling the tank with washing solutions, allows one to reduce the volumes of chemical reactants while maintaining excellent effectiveness. In effect, within the context of the invention, it may be observed that the permeability of the membrane measured after the cleaning operations is close to or equal to that of the new membrane.

In addition, the results also allow it to be shown that the injection of reactant alternately through the top and through the bottom (cleaning operation No. 7) is more effective than when the reactant is simply injected from bottom to top (cleaning operation No. 2).

The prudent combination of the different reactants during the different cleaning sequences permits a reduction both in the volumes of reactant and the cleaning time.

In particular, the cleaning operations carried out in accordance with washing sequence No. 4 using a first cleaning solution containing both sodium hydroxide and chlorine are shown as being particularly effective (cleaning operations Nos. 12 and 14).

These results also reveal a cleaning effectiveness that is significantly greater within the context of the invention when implemented with the tank empty than when this cleaning is carried out with the tank full (cleaning operations Nos. 15 and 17).

Figure 2:
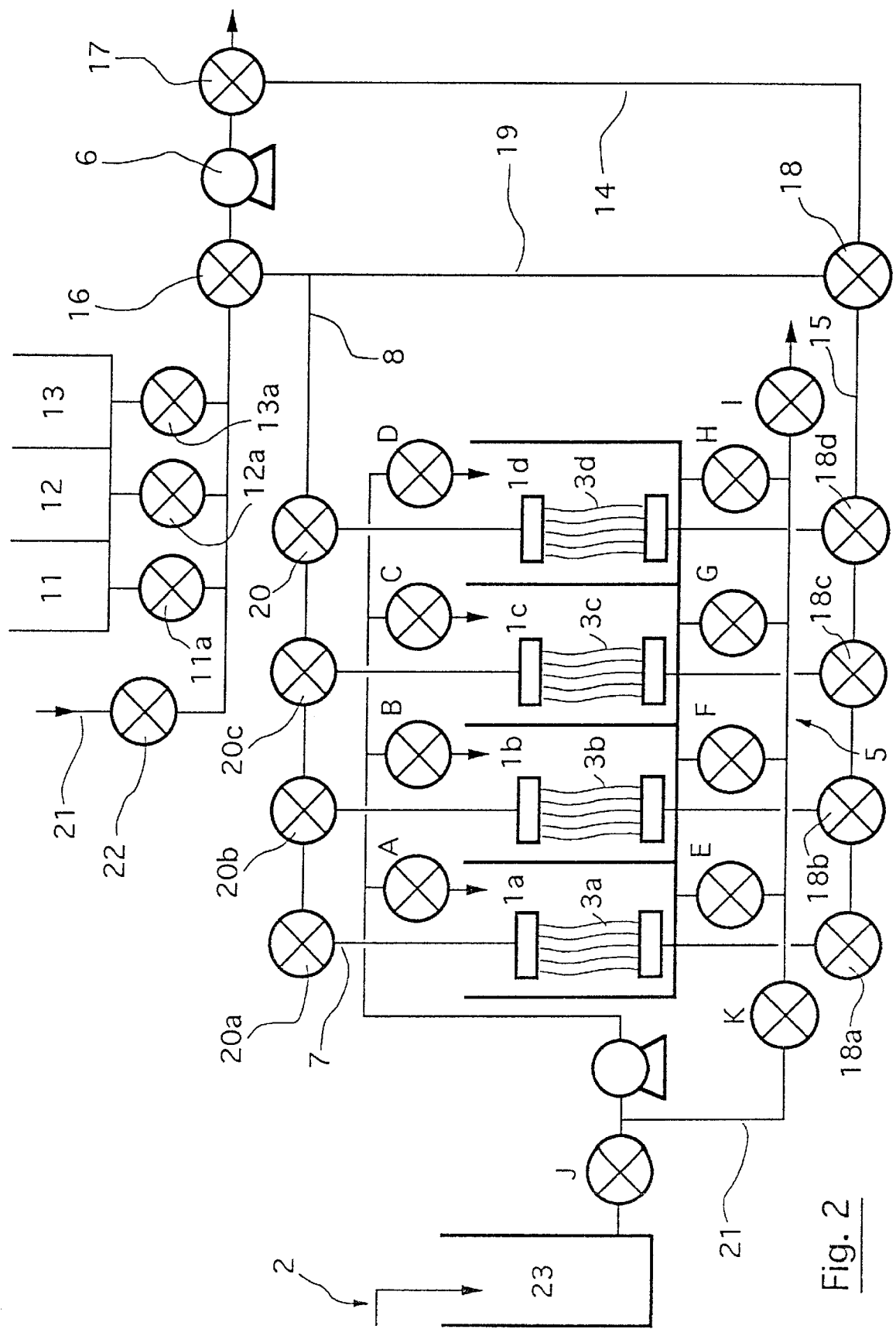
FIG. 2 represents a diagram of a second embodiment of an installation conforming to this invention.

Referring to FIG. 2, a second embodiment of an installation is shown that permits the cleaning of membranes in accordance with the method of the invention without interruption of its use in filtration mode.

In addition to a distribution system for the cleaning solutions that is similar to that for the installation described above, this solution to the problem has four treatment tanks 1a, 1b, 1c, 1d with a plurality of filtration membranes (hollow fibres) organised into modules 3a, 3b, 3c and 3d, installed inside each one.

These modules can be supplied in turn with cleaning solutions thanks to valves 18a, 18b, 18c, 18d (for supplying through the bottom of the membranes) and thanks to valves 20a, 20b, 20c, 20d (for supplying through the top of the membranes).

The means 2 of supplying the tanks with effluent to be filtered include a buffer reservoir 23, a general shut-off valve J and a shut-off valve A, B, C, D for each treatment tank. As for the means for draining the tanks, there is a general shut-off valve I and a shut-off valve for each tank E, F, G, H. Finally the drainage means and the supply means of the tanks are connected to one another by a channel 21 fitted with a shut-off valve K, that allows one at will, to transfer the volume drained from one tank into the other tanks and vice versa.

When the installation is operating at full capacity, the four tanks 1a, 1b, 1c and 1d are supplied with effluent to be filtered. For this purpose, shut-off valves J and A, B, C, D are open while the drainage valves E, F, G, H, I and the valve K are closed.

When one wishes to clean the membranes of one of the tanks, for example tank 1d, the general supply valve J and the valve D for supplying the tank are closed and the valves H and K are opened, the other valves remaining in the same condition as previously. The general supply valve J being closed, the effluent to be filtered that comes into the installation is stored in the buffer reservoir 23. In embodiments where the content of the tank is active (for example when it contains activated carbon or activated sludges) the volume of effluent present in tank 1d is drained from this tank and transferred into the three other tanks 1a, 1b and 1c while the filtration continues.

Once the contents of tank 1d have been completely transferred into the other tanks, the drainage valve H and valve K are closed and valve J is opened. The cleaning solutions can then be fed into the empty tank 1d from reservoirs 11, 12 and 13 alternately through the bottom and through the top of the membranes.

When the cleaning sequence is finished, valve H and valve I are opened to discharge the dirty cleaning solutions present in the bottom of tank 1d. Then the tank can be rinsed by simply opening the valve D that supplies the tank.

So as to once again fill tank 1d with effluent to be treated with the surplus of effluent present in tanks 1a, 1b and 1c, supply valves A, B and C are closed and the drainage valves E, F and G are opened. The drainage valve H of tank 1d is closed as are the general supply valve J and the general drainage valve L. So as to allow the transfer of the surplus from tanks 1a, 1b and 1c into tank 1d, valve K is opened.

Finally in order to allow the installation to return to normal filtration operation, valves A, B, C, D and J are opened and the other valves closed.

Such an installation therefore permits implementation of the method of cleaning membranes according to the invention, while preserving the useful content of the treatment tanks.

Therefore, the invention provides a cleaning method that can be easily automated and that uses undiluted cleaning solutions in small volumes as well as an installation for implementing the method.

The embodiments of the invention described here do not have the objective of reducing the extent of this patent application. It will therefore be possible to bring numerous modifications to the invention without departing from its scope. With regard to the method, one can envisage the use of cleaning solutions other than those indicated, as well as other types of membranes. With regard to the installation, one can provide a number of different tanks and pumping circuits that allow the filtration to continue during the cleaning of the membranes of a tank.

We claim:
1. Method of cleaning a filtration installation comprising a plurality of immersed membranes in at least one tank containing an effluent to be filtered, said method being characterized in that it includes:

at least partially draining the effluent contained in said tank and exposing said membranes to air; and directing at least one cleaning solution through the membranes along a flow path opposite to a filtration flow of the effluent by feeding in said cleaning solution from a permeate side of said membranes.

2. Method according to claim 1, characterized in that it further includes recovering or neutralizing said cleaning solution which has passed through said membranes to a foot of said tank.

3. Method according to claim 1 characterized in that said membranes are in a vertical position inside said tank.

4. Method according to claim 3, characterized in that directing at least one cleaning solution through said membranes along a flow path opposite to the filtration flow of the effluent is carried out by feeding in said cleaning solution through a top and through a bottom of said membranes.

5. Method according to claim 3 characterized in that said directing at least one cleaning solution through said membranes along a flow path opposite to the filtration flow of the effluent is carried out by feeding in said cleaning solution alternately through a top and through a bottom of said membranes.

6. Method according to claim 1, characterized in that it comprises carrying out a cleaning sequence that includes at least one step comprising directing at least one basic cleaning solution to pass through said membranes and at least one step comprising causing at least one acid cleaning solution to pass through said membranes.

7. Method according to claim 6, characterized in that said cleaning sequence includes directing at least one cleaning solution containing at least one oxidizing agent to pass through said membranes.

8. Method according to claim 6, characterized in that said cleaning sequence includes directing at least one cleaning solution containing a base and an oxidizing agent to pass through said membranes and directing at least one acid cleaning solution to pass through said membranes.

9. Method according to claim 6, characterized in that said steps of said cleaning sequence are interspersed by, followed by or preceded by one or more rinsing steps comprising directing water through said membranes.

10. Method according to claim 6, characterized in that said steps of said cleaning sequence are interspersed by, followed by or preceded by one or more soaking steps.

11. Method according to claim 6, characterized in that total duration of said cleaning sequence is between 30 minutes and 4 hours.

12. Method according to claim 1, characterized in that said cleaning solution or solutions is or are used at the rate of a total volume of between 2 and 20 liters per square meter of membrane.

13. A system comprising:
a) at least one treatment tank;
b) a plurality of filtration membranes, each having a top and a bottom, vertically installed inside said at least one treatment tank;
c) means for feeding an effluent to be filtered into said tank;

d) means for draining said tank and at least partially exposing said membranes;

e) means for discharging a permeate from said membranes;

f) at least one storage reservoir for holding a solution for cleaning said membranes;

g) means for feeding said cleaning solution through said membranes in a direction opposite to a direction taken by the effluent as it moves through said membranes; and h) wherein said membranes are cleaned by partially draining said tank through said draining means, thereby exposing said membranes to air prior to feeding the cleaning solution to the membranes through said feeding means.

14. The system of claim 13 wherein said feeding means includes means that allow cleaning solution to be supplied alternately through the top and through the bottom of said membranes.

* * * * *